(12) United States Patent
Austin

(10) Patent No.: US 7,859,708 B2
(45) Date of Patent: Dec. 28, 2010

(54) METHOD AND MULTI-FUNCTION MACHINE HAVING CAPABILITY OF GENERATING AND PRINTING THUMBNAILS CORRESPONDING TO SCANNED DOCUMENTS

(75) Inventor: Paul Austin, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1048 days.

(21) Appl. No.: 11/638,718

(22) Filed: Dec. 14, 2006

(65) Prior Publication Data

US 2008/0144069 A1    Jun. 19, 2008

(51) Int. Cl.
  *G06F 3/12*    (2006.01)
(52) U.S. Cl. ............... 358/1.18; 358/1.12; 358/448; 345/667; 382/286; 382/289
(58) Field of Classification Search ....... 358/1.12–1.16, 358/448; 345/667; 382/286, 289
  See application file for complete search history.

(56) References Cited

U.S. PATENT DOCUMENTS

| | | | |
|---|---|---|---|
| 6,900,819 B2 * | 5/2005 | Marshall et al. ............. | 345/667 |
| 7,454,040 B2 * | 11/2008 | Luo et al. ................... | 382/117 |
| 2004/0139390 A1 | 7/2004 | Krolczyk et al. | |
| 2005/0180658 A1 | 8/2005 | Curry et al. | |
| 2005/0198558 A1 * | 9/2005 | Chrisop et al. .............. | 715/500 |
| 2007/0085925 A1 * | 4/2007 | Schroderus ............ | 348/333.02 |

\* cited by examiner

*Primary Examiner*—Chan S Park
(74) *Attorney, Agent, or Firm*—Carter, DeLuca, Farrell & Schmidt, LLP

(57) ABSTRACT

A method and a multi-function machine are provided for generating and arranging thumbnails corresponding to scanned documents. The thumbnails are printed on a sheet in accordance with a particular arrangement for enabling an operator to view and easily discern any scanning problems, or incorrect scanning settings. In particular, the multi-function machine includes a scanning assembly; a printing assembly; a thumbnail generation and arrangement module configured to generate thumbnails corresponding to documents scanned by the scanning assembly, said thumbnail generation and arrangement module further configured to arrange the thumbnails for printing by the printing assembly; and at least one processor configured to sense the completion of a document scanning procedure by the scanning assembly and, prior to or after the completion of the document scanning procedure, to automatically actuate said printing assembly for printing the arranged thumbnails.

19 Claims, 2 Drawing Sheets

METHOD AND MULTI-FUNCTION MACHINE HAVING CAPABILITY OF GENERATING AND PRINTING THUMBNAILS CORRESPONDING TO SCANNED DOCUMENTS

REFERENCE TO RELATED APPLICATIONS

This application is related to a commonly-owned patent application having the title "Systems and Methods for Generating Document Distribution Confirmation Sheets With Thumbnail Images of Pages", filed on Jan. 15, 2003 and assigned U.S. patent application Ser. No. 10/248,386; the entire contents of this patent application are incorporated herein by reference. This application is also related to a commonly-owned patent application having the title "Method and Apparatus for Reduced Size Image", filed on Feb. 12, 2004 and assigned U.S. patent application Ser. No. 10/776,620; the entire contents of this patent application are incorporated herein by reference.

BACKGROUND

The present disclosure relates to multi-function machines, and more particularly, to a method and a multi-function machine having the capability of generating and printing thumbnails or reduced size images corresponding to scanned documents.

"Multi-functions" machines have become familiar in offices and in home computing environments. Whereas, previously, functions such as copying, printing, and facsimile transmission have been performed by single dedicated copiers, printers, and facsimiles respectively, a multi-function machine is typically capable of providing all such functions and more in a single machine. Typically, such a multi-function machine includes a single print engine, which can serve to output copies, prints, or received facsimiles; as well as a single input scanner which can serve to record data from original images for use in copying, facsimile transmission, and retention of input image data to a predetermined location in a computer memory ("scan-to-file").

Such multi-function machines are typically connected to data networks, such as the Internet, for exchange of both image data and associated operational instructions. Their connection to data networks also enables a user to scan a document to create an electronic image file and email the electronic image file using a scan-to-email function typically found on such multi-function machines. The scan-to-email function can also be used to email a previously stored electronic image file using the scan-to-file function. The multi-function machine can be a xerographic machine which uses xerographic printing techniques to print a reproduction of a document placed on a platen glass. Exemplary xerographic multi-function machines are the Xerox WorkCentre™ PE120 and Pro65 models available from the XEROX Corporation.

The scan-to-email function generally enables the user to use a personal computer connected to the multi-function machine via a data network or a computer incorporated with the multi-function machine to execute an email editor, access the electronic image file from a memory of the multi-function machine and import it to the email editor for transmitting it as an attachment to an email message composed using the email editor. The message and the attachment are transmitted to one or more recipients whose email address is provided in the header of the graphical user interface of the email editor and all individuals associated with the one or more aliases also provided in the header by selecting a "Send" icon. Once the email with the accompanying electronic image file attachments are received by the recipients, the email message and the attachments can be viewed. The attachments can be electronic image files of scanned documents in a TIFF, multi-page TIFF, JPG, PDF or other formats.

Conventional scan-to-file and scan-to-email functions provided on a host of multi-function machines typically scan documents without any problems. Occasionally, however, problems occur while scanning documents using the scan-to-file and scan-to-email functions; the problems may be due to a host of reasons, such as incorrect scan settings, skew in automatic document feeders, and document misfeeds. An operator or user of a multi-function machine typically does not realize that a problem occurred during scanning and proceeds subsequent to scanning the documents to save and/or email the images corresponding to the scanned documents.

SUMMARY

It is an aspect of the present disclosure to provide a method and a multi-function machine having the capability of generating and printing thumbnails (also referred to as thumbnail images or reduced size images) corresponding to scanned documents. The thumbnails are automatically printed on one or more sheets by the multi-function machine during or following the completion of the scanning procedure in order for an operator to view the thumbnail corresponding to the scanned documents and determine which sheets, if any, have problems and should be rescanned, or if there is a need to rescan all the sheets with different scan settings. Each thumbnail can be generated simultaneously with the scanning of its corresponding document by a scanning assembly of the multi-function machine, or all the thumbnails can be generated at the completion of the scanning procedure.

According to the present disclosure, a method and a multi-function machine having the capability of generating and printing thumbnails of images corresponding to scanned documents are provided for enabling an operator to view the thumbnails and determine which sheets, if any, have problems and should be rescanned, or if there is a need to rescan all the sheets with different scan settings. The multi-function machine includes a print thumbnails software program having a set of programmable instructions. The multi-function machine further includes at least one processor for executing the set of programmable instructions of the print thumbnails software program for performing the functions of generating and printing thumbnails corresponding to scanned documents in accordance with the present disclosure.

In particular, the present disclosure provides a multi-function machine of the type having the capability of performing at least the functions of scanning, copying and electronically transmitting documents. The multi-function machine includes a scanning assembly; a printing assembly; a thumbnail generation and arrangement module configured to generate thumbnails corresponding to documents scanned by the scanning assembly. The thumbnail generation and arrangement module is further configured to arrange the thumbnails for printing by the printing assembly. The multi-function machine further includes at least one processor configured to sense the completion of a document scanning procedure by the scanning assembly and, prior to or after sensing the completion of the document scanning procedure, to automatically actuate the printing assembly for printing the arranged thumbnails. The thumbnail generation and arrangement module includes a print thumbnails software program having set of programmable instructions configured for execution by the at least one processor for generating the thumbnails corresponding to the documents scanned by the scanning assembly of the multi-function machine and for arranging the thumbnails for printing by the printing assembly of the multi-function machine.

Additionally or alternatively, the thumbnail generation and arrangement module includes at least one of firmware, software and hardware for generating the thumbnails corresponding to the documents scanned by the scanning assembly of the multi-function machine and for arranging the thumbnails for printing by the printing assembly of the multi-function machine. The documents can be scanned by the scanning assembly using a user-selectable scanning feature of the multi-function machine, such as the scan-to-file or scan-to-email feature.

The method for generating and printing thumbnails corresponding to scanned documents includes performing a document scanning procedure whereby documents are scanned by a scanning assembly of a multi-function machine of the type having the capability of performing at least the functions of scanning, copying, and electronically transmitting documents; generating thumbnails corresponding to the scanned documents at least one of during the document scanning procedure and following the document scanning procedure; and printing the generated thumbnails using a printing assembly of the multi-function machine without receiving a user input.

The present disclosure also provides a computer-readable medium storing a set of programmable instructions configured for being executed by at least one processor for performing a method of generating and printing thumbnails corresponding to documents scanned by a multi-function machine of the type having the capability of performing at least the functions of scanning, copying and electronically transmitting documents. The method includes performing a document scanning procedure whereby documents are scanned by a scanning assembly of the multi-function machine; generating thumbnails corresponding to the scanned documents at least one of during the document scanning procedure and following the document scanning procedure; and printing the generated thumbnails using a printing assembly of the multi-function machine without receiving a user input. The method further includes generating at least one annotation for at least one of overlaying over at least one generated thumbnail during printing by the printing assembly and printing in proximity to the at least one generated thumbnail on a sheet.

Additionally, the present disclosure provides a sheet printed by a multi-function machine of the type having the capability of scanning, copying and electronically transmitting documents. The sheet includes a plurality of thumbnails each respectively corresponding to at least one of a plurality documents scanned by the multi-function machine; and a graphic background enabling a viewer of the sheet to discern skewing in at least one of the scanned documents. The sheet also includes at least one annotation overlaying over at least one of the plurality of thumbnails and in proximity to the at least one of the plurality of thumbnails.

BRIEF DESCRIPTION OF THE DRAWINGS

Various embodiments of the present disclosure will be described herein below with reference to the figures wherein.

DETAILED DESCRIPTION

Figure 1:
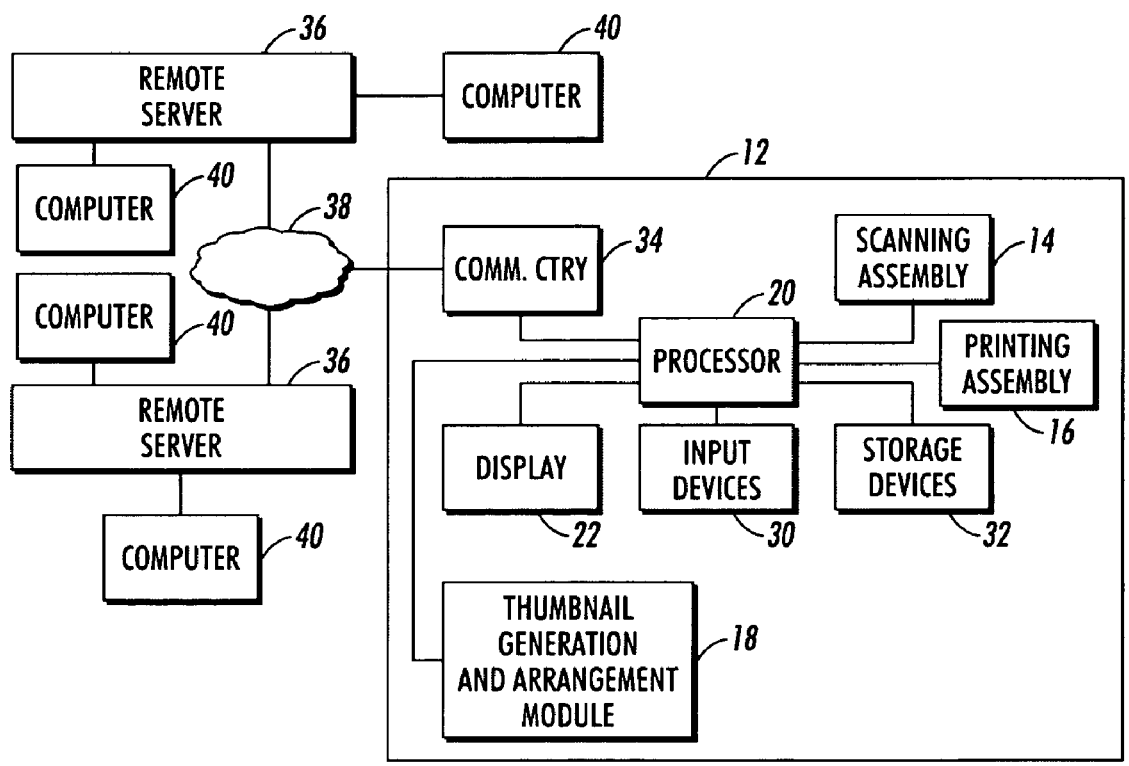
FIG. 1 is a block diagram of a system having a multi-function machine for generating and printing thumbnails corresponding to scanned documents in accordance with the present disclosure.

The present disclosure provides a method and a multi-function machine having the capability of generating and printing thumbnails corresponding to scanned documents. In particular, the present disclosure provides a method and a multi-function machine having the capability of generating and printing thumbnails (also referred to as thumbnail images or reduced size images) corresponding to scanned documents. The thumbnails are automatically printed on one or more sheets by the multi-function machine during or following the completion of the scanning procedure in order for an operator to view the thumbnail corresponding to the scanned documents and determine which sheets, if any, have problems and should be rescanned, or if there is a need to rescan all the sheets with different scan settings.

As further described below with reference to the figures, the multi-function machine is of the type having the capability of scanning, copying and electronically transmitting documents. The scanned documents can be electronically transmitted by email and/or by facsimile transmission protocols. The multi-function machine can be a xerographic multi-function machine.

The multi-function machine according to the present disclosure includes a print thumbnails software program having a set of programmable instructions. The multi-function machine further includes at least one processor for executing the set of programmable instructions of the print thumbnails software program for performing the functions of generating thumbnails and arranging the thumbnails corresponding to scanned documents for printing in accordance with the present disclosure. The thumbnails are printed by a printing assembly of the multi-function machine during or following the completion of the document scanning procedure.

The print thumbnails software program can be packaged and distributed as a software package for downloading to the multi-function machine where the set of programmable instructions are stored within at least one computer-readable medium, such as a CD-ROM, diskette, etc. The print thumbnails software program can also be downloaded to the multi-function machine through a network connection connecting the multi-function machine to a remote computer station, such as a remote server, storing the print thumbnails software program.

In particular, the present disclosure provides a multi-function machine of the type having the capability of scanning, copying and electronically transmitting documents. The multi-function machine includes a scanning assembly; a printing assembly; a thumbnail generation and arrangement module configured to generate thumbnails corresponding to documents scanned by the scanning assembly. The thumbnail generation and arrangement module is further configured to arrange the thumbnails for printing by the printing assembly. The multi-function machine further includes at least one processor configured to sense the completion of a document scanning procedure by the scanning assembly and, prior to or after the sending of the completion of the document scanning procedure, to automatically actuate the printing assembly for printing the arranged thumbnails. That is, the printing assembly is actuated without any user input for printing the generated thumbnails.

Additionally or alternatively, the thumbnail generation and arrangement module includes at least one of firmware, software and hardware for generating the thumbnails corresponding to the documents scanned by the scanning assembly of the multi-function machine and for arranging the thumbnails for printing by the printing assembly of the multi-function machine. The documents can be scanned by the scanning assembly using a user-selectable scanning feature of the multi-function machine, such as the scan-to-file or scan-to-email feature. Following the document scanning procedure, the scanned documents can be saved in one of a plurality of formats, such as TIFF, multi-page TIFF, JPG, PDF or other formats.

The method in accordance with the present disclosure for generating and printing thumbnails corresponding to scanned documents includes performing a document scanning procedure whereby documents are scanned by a scanning assembly of a multi-function machine of the type having the capability of performing at least the functions of scanning, copying, and electronically transmitting documents; generating thumbnails corresponding to the scanned documents at least one of during the document scanning procedure and following the document scanning procedure; and printing the generated thumbnails using a printing assembly of the multi-function machine without receiving a user input. It is contemplated that the steps of the method in accordance with the present disclosure can be performed in a different ordering than the ordering provided above.

With reference to FIG. 1, there is shown a block diagram of a system having a multi-function machine for generating, arranging and printing thumbnails corresponding to scanned documents in accordance with the present disclosure. The multi-function machine is of the type having the capability of scanning, copying and electronically transmitting documents.

In FIG. 1, the system is designated generally by reference numeral 10 and the multi-function machine is designated generally by reference numeral 12. The documents are scanned by a scanning assembly 14 of the multi-function machine 12 during a document scanning procedure and the thumbnails are automatically printed on one or more sheets by a printing assembly 16 of the multi-function machine 12 during or following the completion of the document scanning procedure.

In accordance with the present disclosure, the multi-function machine 12 further includes a thumbnail generation and arrangement module 18 having at least one of software, firmware and hardware for generating and arranging thumbnails corresponding to the scanned documents. In one embodiment, the thumbnail generation and arrangement module 18 includes a print thumbnails software program having a set of programmable instructions configured for execution by at least one processor 20 of the multi-function machine 12 for generating the thumbnails corresponding to the documents scanned during the document scanning procedure by the scanning assembly 14 of the multi-function machine 12 and arranging the thumbnails for printing by the printing assembly 16 of the multi-function machine 12.

The thumbnails are transmitted to the printing assembly 16 following the completion of the document scanning procedure or during the document scanning procedure. As such, the printing assembly 16 is configured to print the thumbnails after completion of the document scanning procedure or during the document scanning procedure without the multi-function machine 12 receiving a user input.

The completion of the document scanning procedure is sensed or determined by the at least one processor 20 receiving a signal from a document sensor provided in proximity to a document feed assembly of the multi-function machine 12. The sensor senses the presence of a document inserted within the document feed assembly. When the sensor does not sense the document following actuation of a document scanning procedure, it transmits a signal to the at least one processor 20 informing the at least one processor 20 that there are no additional documents to be scanned.

Figure 2:
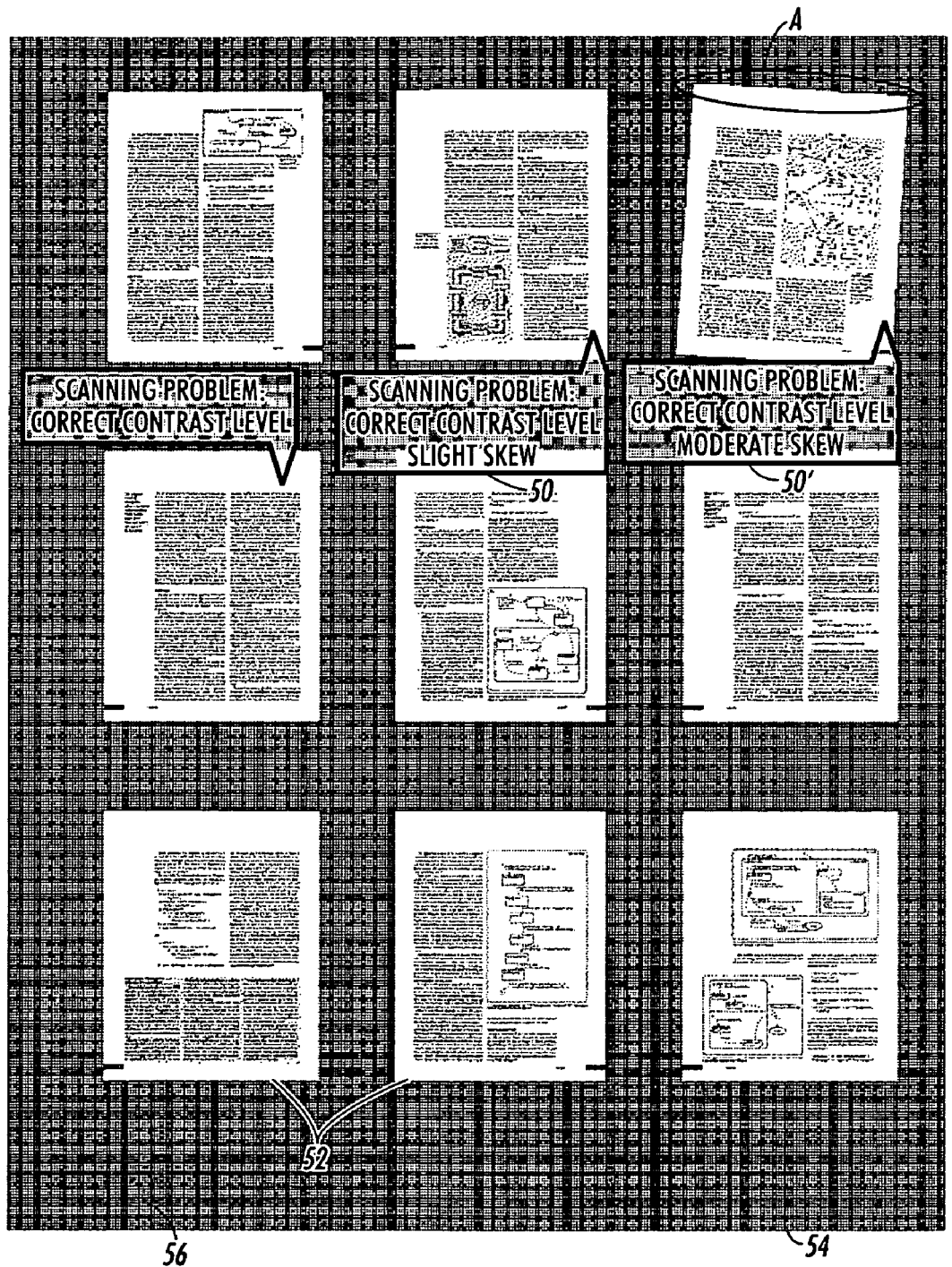
FIG. 2 is an enlarged view of a portion of a sheet having thumbnails corresponding to scanned documents printing by the multi-function machine shown by FIG. 1 in accordance with the present disclosure.

The thumbnail generation and arrangement module 18 arranges the thumbnails 52 in a row and column arrangement as shown by FIG. 2. However, other arrangements are contemplated within the context of the present disclosure.

The set of programmable instructions of the module 18 can be application software stored within a memory, such as RAM and ROM, of the at least one processor 20 and/or a computer-readable medium, such as a hard drive, CD-ROM, DVD, 3.5" diskette, etc., readable by one or more reading devices of the multi-function machine 12.

In an alternate embodiment, the functions of generating and arranging the thumbnails can be performed by incorporating within the module 18 or connecting to the multi-function machine 12 a reduced size image generator. The generator generates and arranges the thumbnails in a format suitable for printing. The arranged thumbnails are transmitted by the module 18 via the at least one processor 20 to the printing assembly 16 to be printed. The reduced size image generator can be the reduced size image generator described in co-pending and commonly owned U.S. patent application Ser. No. 10/776,620, now U.S. Pat. No. 7,302,116, "METHOD AND APPARATUS FOR REDUCED SIZE IMAGE", by Curry et al. issued Nov. 7, 2007.

The thumbnail generation and arrangement module 18 can also include additional programmable instructions (i.e., software), firmware and/or hardware for enabling the multi-function machine 12 to perform other functions, such as analyzing the generated thumbnails or other images corresponding to the scanned documents for characteristics indicative of skewing problems, improper scan settings (such as contrast, size, incorrect paper selection, etc.), etc., and alerting the operator accordingly by displaying a message on a display device 22 of the multi-function machine.

Additionally or alternatively, the module 18 can include software, firmware and/or hardware for performing the function or having the at least one processor 20 perform the function of generating annotations 50 (see FIG. 2) which are overlaid over one or more of the corresponding thumbnails 52 during printing by the printing assembly 16. The annotations can also be printed in proximity to the printed thumbnails 52 on the sheet 54. The annotations can indicate possible scanning problems, incorrect operator settings, etc. for quickly informing the operator.

Additionally or alternatively, the module 18 can be programmed for enabling the operator to change the number of thumbnails 52 printed on the sheet 54, to change the thumbnail printing format, and for having printed on the sheet 54 meta-data, such as the electronic destination of the scanned documents, the scanning settings, file name, operator's name, date, time, and other information.

Additionally or alternatively, the module 18 can include software, firmware and/or hardware for image processing the scanned documents. This includes enabling the module 18 to analyze the images corresponding to the scanned documents to automatically detect and correct skewing errors, detect and correct color variations, detect and correct contrast errors, detect and correct redeye, etc. The module 18 then generates thumbnails which correspond to the image processed scanned documents.

As shown by FIG. 2, the sheet 54 is provided with a graphic background, such as a cross-hatched background 56, for aiding the operator in quickly determining or discerning skewing in at least one of the scanned documents. For example, the area identified by reference numeral 58 in FIG. 2 indicates a moderate skew in the scanned document which is easily discernible by the cross-hatched background 56. The moderate skew is also noted by the annotation identified by reference numeral 50'.

The at least one processor 20 of the multi-function machine 12 besides being in operable communication with the scanning and printing assemblies 14, 16, and the display device 22, it is further in operable communication with one or more input devices 30, such as a keypad and control panel; one or more external storage devices 32, such as a database; and communication circuitry 34 for enabling the multi-function machine 12 to receive and transmit messages from and to one or more remote servers 36 via a communications network 38, such as the Internet. The one or more servers 36 are linked to a plurality of computers or terminals 40 as known in the art.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multi-function machine of the type having the capability of scanning, copying and electronically transmitting documents, the machine comprising:
   a scanning assembly;
   a printing assembly;
   a thumbnail generation and arrangement module configured to generate thumbnails corresponding to documents scanned by the scanning assembly, said thumbnail generation and arrangement module further configured to arrange the thumbnails for printing by the printing assembly; and
   at least one processor configured to sense the completion of a document scanning procedure by the scanning assembly and, prior to or after sensing the completion of the document scanning procedure, to automatically actuate said printing assembly for printing at least a portion of the arranged thumbnails, the thumbnail generation and arrangement module generating at least one annotation, the at least one annotation comprising a message indicating a scanning problem occurred during the document scanning procedure for the document corresponding to at least one generated thumbnail, wherein
   the at least one generated annotation is at least one of overlaid over the at least one generated thumbnail during printing by the printing assembly and printed in proximity to the at least one generated thumbnail.

2. The multi-function machine according to claim 1, wherein the thumbnail generation and arrangement module includes a print thumbnails software program having a set of programmable instructions configured for execution by the at least one processor for generating the thumbnails corresponding to the documents scanned and arranging the thumbnails for printing by the printing assembly.

3. The multi-function machine according to claim 1, wherein the thumbnail generation and arrangement module arranges the thumbnails in a row and column arrangement.

4. The multi-function machine according to claim 1, wherein the scanning assembly scans the documents in accordance with a user-selectable scanning feature, and wherein the scanning feature is selected from the group consisting of scan-to-file and scan-to-email features.

5. The multi-function machine according to claim 1, wherein the thumbnail generation and arrangement module comprises means for analyzing the generated thumbnails for characteristics indicative of skewing problems and improper scan settings.

6. The multi-function machine according to claim 1, wherein the thumbnail generation and arrangement module is further configured for image processing the scanned documents, and wherein the generated thumbnails correspond to the image processed scanned documents.

7. The multi-function machine according to claim 1, wherein the thumbnail generation and arrangement module is programmable for enabling the operator to change the number of thumbnails printed on a sheet, to change a thumbnail printing format, and for printing on the sheet at least one of an electronic destination of the scanned documents, scanning settings, operator's name, date and time.

8. The multi-function machine according to claim 1, wherein the multi-function machine is a xerographic multi-function machine.

9. The multi-function machine according to claim 1, wherein the at least one annotation further comprises a message of instructions for correction of the scanning problem.

10. A method for generating and printing thumbnails corresponding to scanned documents, the method comprising:
    performing a document scanning procedure whereby documents are scanned by a scanning assembly of a multi-function machine of the type having the capability of performing at least the functions of scanning, copying, and electronically transmitting documents;
    generating at least a portion of thumbnails corresponding to the scanned documents at least one of during the document scanning procedure and following the document scanning procedure;
    printing the generated thumbnails using a printing assembly of the multi-function machine without receiving a user input; and
    generating at least one annotation, the at least one annotation comprising a message indicating a scanning problem occurred during the document scanning procedure for the document corresponding to at least one generated thumbnail, wherein
    the at least one generated annotation is at least one of overlaid over the at least one generated thumbnail during said printing by the printing assembly and printed in proximity to the at least one generated thumbnail.

11. The method according to claim 10, wherein the printing step further comprises printing meta-data in proximity to the printed thumbnails, and further comprising arranging the generated thumbnails in accordance with a particular arrangement for printing by the printing assembly.

12. The method according to claim 10, further comprising the step of sensing the completion of the document scanning procedure prior to the printing step, wherein the step of printing the generated thumbnails is performed at least partially during the performance of the document scanning procedure or following the completion of the document scanning procedure.

13. The method according to claim 10, further comprising image processing the scanned documents, wherein the generated thumbnails correspond to the image processed scanned documents.

14. The method according to claim 10, wherein the performing step scans the documents in accordance with a user-selectable scanning feature, and wherein the scanning feature is selected from the group consisting of scan-to-file and scan-to-email features.

15. The method according to claim 10, further comprising analyzing the generated thumbnails for characteristics indicative of skewing problems and improper scan settings.

16. The method according to claim 10, wherein the multi-function machine is a xerographic multi-function machine.

17. The method according to claim 10, further comprising the step of alerting a user of the multi-function machine by the user viewing the at least one annotation comprising the message indicating a scanning problem.

18. The method according to claim 10, wherein the at least one annotation further comprises a message of instructions for correction of the scanning problem, the method further comprising correcting the scanning problem based on the message of instructions for correction of the scanning problem.

19. A non-transitory computer-readable medium storing a set of programmable instructions configured for being executed by at least one processor for performing a method of generating and printing thumbnails corresponding to documents scanned by a multi-function machine of the type having the capability of performing at least the functions of scanning, copying and electronically transmitting documents, the method comprising:

performing a document scanning procedure whereby documents are scanned by a scanning assembly of the multi-function machine;

generating at least a portion of thumbnails corresponding to the scanned documents at least one of during the document scanning procedure and following the document scanning procedure;

printing the at least a portion of the generated thumbnails using a printing assembly of the multi-function machine without receiving a user input; and generating at least one annotation, the at least one annotation comprising a message indicating a scanning problem occurred during the document scanning procedure for the document corresponding to at least one generated thumbnail, wherein the at least one generated annotation is at least one of overlaid over the at least one generated thumbnail during said printing by the printing assembly and printed in proximity to the at least one generated thumbnail.

* * * * *